UNITED STATES PATENT OFFICE.

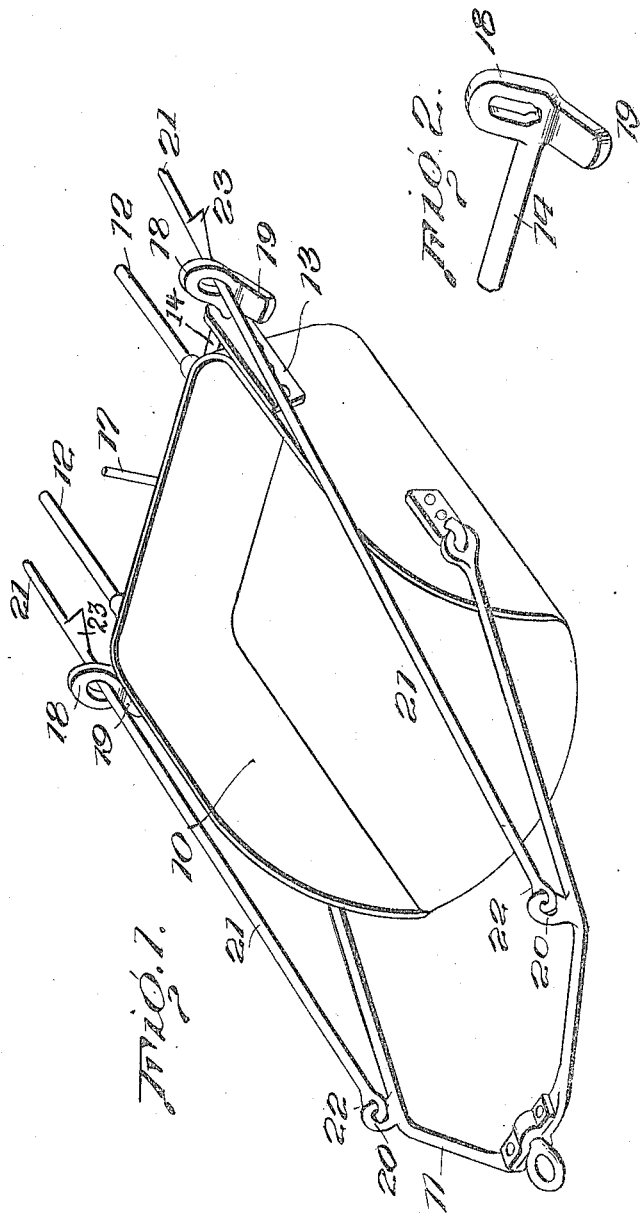

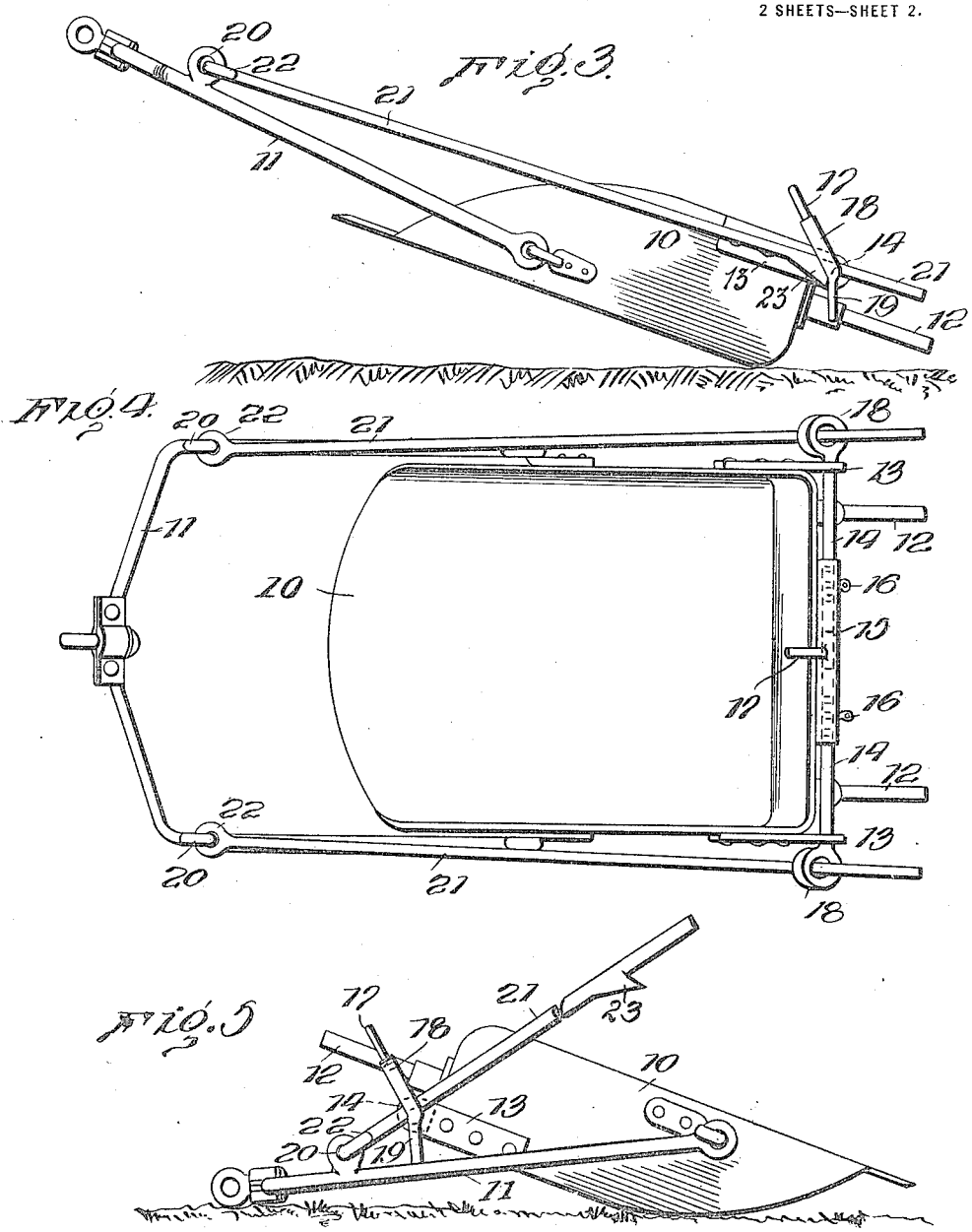

HUGO GROTZKY, OF CHAPMAN, NEBRASKA.

SCRAPER.

1,196,231.  Specification of Letters Patent.  Patented Aug. 29, 1916.

Application filed October 13, 1915. Serial No. 55,666.

*To all whom it may concern:*

Be it known that I, HUGO GROTZKY, a citizen of the United States, residing at Chapman, in the county of Merrick and State of Nebraska, have invented certain new and useful Improvements in Scrapers, of which the following is a specification.

This invention relates to improvements in earth scrapers or horse drawn excavators, and has for one of its objects to improve the construction and increase the efficiency and utility of devices of this character.

Another object of the invention is to provide a simply constructed device adapted to be attached to scrapers of various forms and whereby the scraper may be moved over the ground to receive its load and prevented from being tilted prematurely, the front elevated and held in elevated position to enable the loaded scraper to be conducted to the point where it is to be dumped, and then overturned to discharge the load.

Another object of the invention is to provide a simply constructed attachment which operates partially automatically to reduce the amount of manual labor required to actuate the device.

With these and other objects in view, the invention consists in certain novel features of construction as hereinafter shown and described and then specifically pointed out in the claims; and in the drawings illustrative of the preferred embodiment of the invention—Figure 1 is a perspective view of the improved device with the parts in operative position, or with the hopper or receiver in position to gather its load; Fig. 2 is an enlarged detached perspective view of one of the trip devices; Fig. 3 is a side elevation with the hopper or receiver in position to be transported to the dumping ground; Fig. 4 is a plan view with the parts arranged as in Fig. 3; Fig. 5 is a view similar to Fig. 3, showing the hopper or receiver in overturned or dumped position.

Corresponding and like parts are referred to in the following description and indicated in all the views of the drawings by the same reference characters.

The improved device may be applied to any of the various forms of scrapers or horse drawn excavators, and it is not desired, therefore, to limit the invention to any specific form of hopper or receiver, but for the purpose of illustration, a conventional hopper or receiver is represented at 10 with the draft bail at 11 and the handles at 12.

The improved attachment includes ears or bearings 13 riveted or otherwise secured to the body 10 and extending rearwardly thereof and supporting shaft sections 14, the latter being united at their inner ends by a coupling sleeve 15. The shaft sections are each provided with a plurality of holes to receive pins 16, so that the shaft sections may be adjusted to scraper bodies of various widths and forms. The sleeve 15 is provided with an operating handle 17 to enable the sleeve and the shaft sections to be oscillated. The outer end of each of the shaft sections 14 is provided with a slotted or elongated eye 18, each eye having a tripping projection 19 extending obliquely to the longitudinal axis of the eye.

The sides of the bail 11 are each provided with an eye 20 or like device to which a rod 21 is coupled to swing by an eye 22. The rods 21 are slidably disposed respectively through the eyes 18 and each provided with a downwardly directed stop 23. Each of the stops 23 is formed with one face at a short angle to the longitudinal plane of the rod and the other face with a longer incline, as shown. By this means, when the bail 11 is moved into its lower position, the rods 21 will be drawn through the eyes 18 until the shorter inclined faces of the projections 23 pass through the eyes and are disposed in position to be engaged by the inclined portions 19. By this arrangement, when the lever arm 14 is moved into its forward position, as shown in Figs. 3 and 4, the trip faces 19 will be disposed substantially perpendicular or nearly at right angles to the longitudinal planes of the rods with the portions 19 engaged by the projections 23. By this means the rods 21 are held from movement in one direction, the object to be hereafter explained.

With a device thus constructed, the operation is as follows: To fill the hopper, the operator moves the handle 17 rearwardly, which movement disposes the links 18 in a rearward inclined position and elevates the trip portions 19 and thereby engaging the projections 23 and releasing the rods 21 and leaving them free to run through the eyes 16. This enables the hopper to be elevated at the rear end by the handles 12 into the proper position to receive its load as it is drawn over the ground, the rods 21 offering no resistance to this adjustment of the hopper. When the hopper has received its load, the operator moves the lever 17 into its forward position and releases the handles 12 and permits the hopper to drop by gravity. This movement causes the eyes 18 to move rearwardly over the rods 21 until the projections 23 pass through the eyes and again engage the stop portions 19. The handles 12 are then depressed to elevate the "nose" end of the hopper into the position shown in Fig. 3. The device is then in position to be drawn over the ground to the point where it is to be dumped, and when this location is reached, the operator moves the lever 17 rearwardly and causes the trip members 19 to release the projections 23 and the rods 21 and permit the "nose" of the hopper to engage the ground and be thrown over into the position shown in Fig. 5 by the continued forward movement of the draft animals, the rods 21 automatically assuming the position shown in Fig. 5.

When the "bucket" is discharged, the operator draws the upper end rearwardly until the projections 23 again engage the trip portions 19, and the scraper returned for another load.

The improved device is simple in construction, can be inexpensively manufactured and applied as an attachment to scrapers without material structural change therein and to scrapers of various forms and makes.

Having thus described the invention, what is claimed as new is:

1. In a scraper including a draft bail, a shaft mounted for oscillation and having guide slots, rods connected to said bail and operative through said slots, each of said rods having a stop adapted to engage said shaft to limit the movement of the rod in one direction, and means for oscillating said shaft to release the stops from engagement with said shaft.

2. A device of the class described comprising a shaft adapted to be mounted for rotation on a scraper and having eyes, rods adapted to be swingingly coupled to the draft bail of the scraper and movable through said eyes, each of said rods having a stop to limit the movement of the rods in one direction relative to the eyes, and means for operating said shaft to release the rods and permit the dumping of the scraper.

3. A device of the class described comprising a shaft adapted to be mounted for oscillation on a scraper and having eyes and releasing projections merging into the eyes, rods adapted to be coupled to the draft bail of the scraper and movable through said eyes, each of said rods having a stop adapted to engage one of the releasing projections to lock the rods to the eye when the shaft is disposed in one position, and means for oscillating said shaft.

4. In a device of the class described comprising bearings adapted to be attached to a scraper, a shaft mounted for rotation in said bearings and having eyes, rods adapted to be swingingly coupled to the draft bail of a scraper and movable through said eyes, each of said rods having a stop to limit the movement of the rods in one direction relative to the eyes, and means for operating said shaft to release the rods and permit the dumping of the scraper.

5. A device of the class described comprising bearings adapted to be attached to a scraper body, shaft sections mounted for rotation in said bearings and having eyes, a coupling sleeve adjustably engaged with said shaft sections and having an operating lever, rods adapted to be swingingly coupled to the draft bail of a scraper and movable through said eyes, each of said rods having a stop to limit the movement of the rods in one direction relative to the eyes, and means for operating said shaft to release the rods and permit the dumping of the scraper.

In testimony whereof I affix my signature.

HUGO GROTZKY. [L. S.]

Copies of this patent may be obtained for five cents each, by addressing the "Commissioner of Patents, Washington, D. C."